Patented June 5, 1934

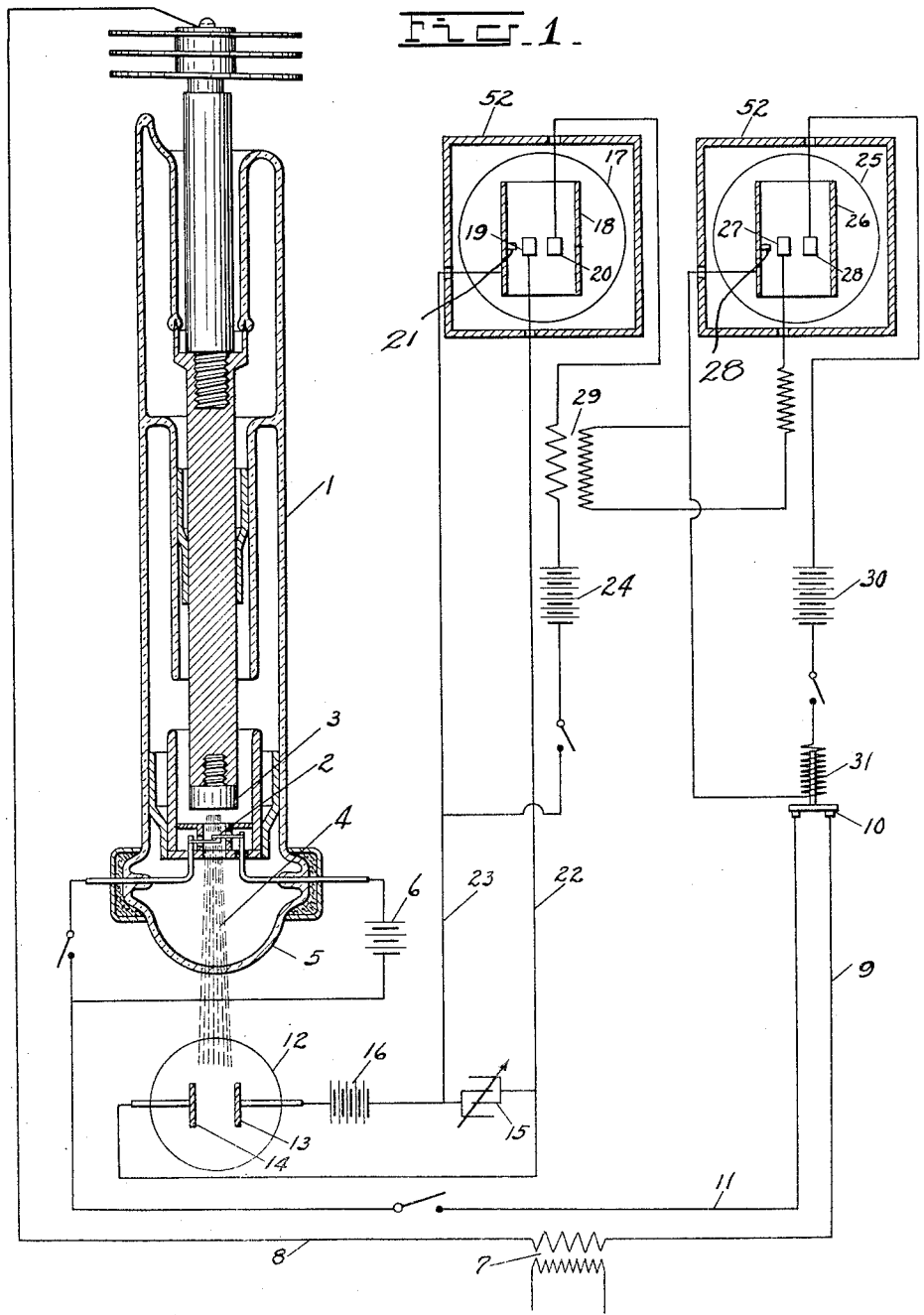

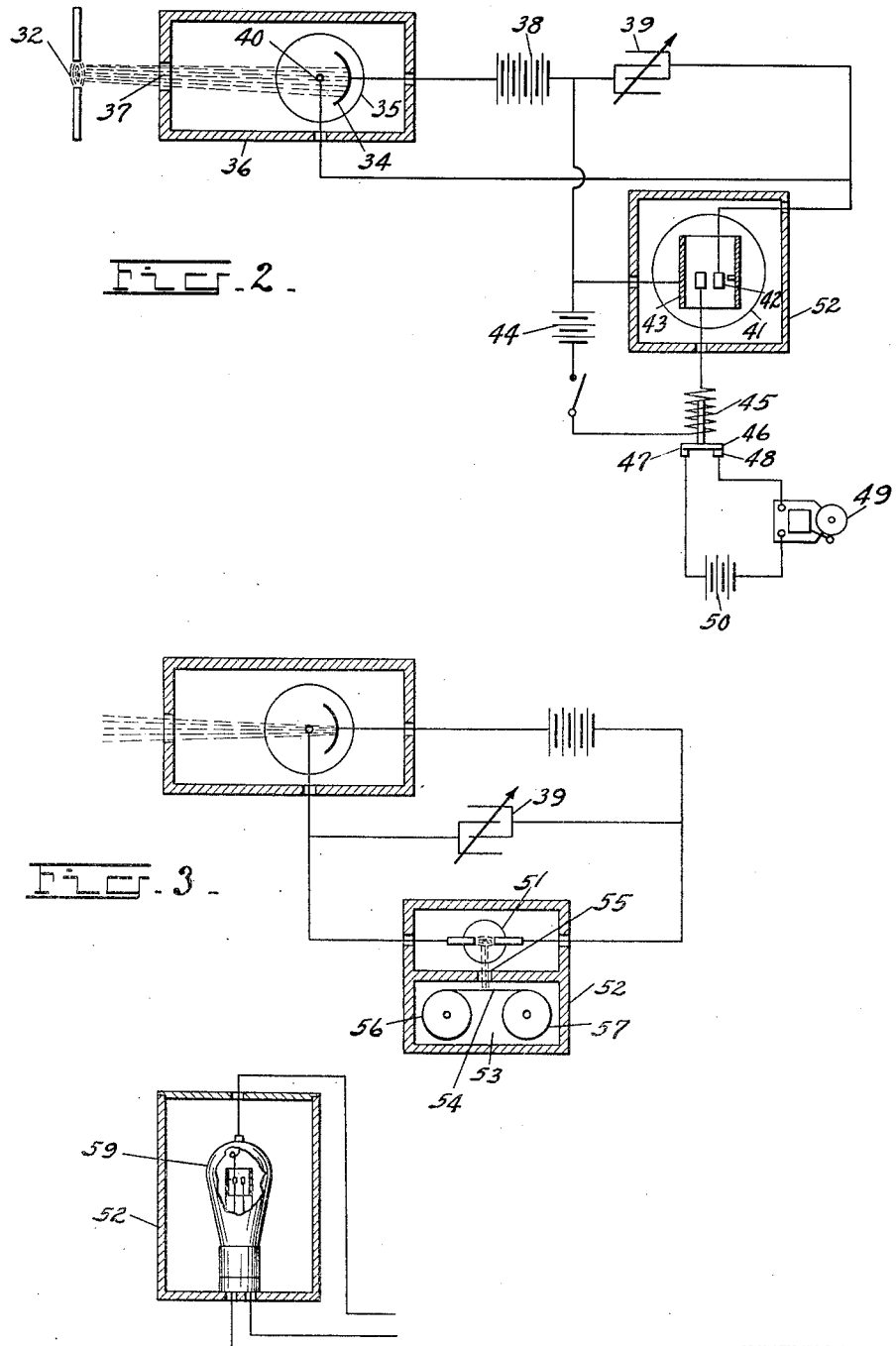

1,961,717

UNITED STATES PATENT OFFICE 1,961,717

RAY INTENSITY METER SYSTEM

Charles Hastings Thomas, Bloomfield, N. J., assignor to Westinghouse Lamp Company, a corporation of Pennsylvania Application January 10, 1930, Serial No. 419,825

12 Claims. (Cl. 250—34)

This invention relates to a system for increasing the intensity of electro-magnetic radiations in the visible or invisible regions over a period of time and for utilizing such radiations to determine the period of operation of or subjection of a person or object to a source of such radiations, and is an improvement over copending application Serial No. 328,243 filed December 24, 1928 by H. C. Rentschler, entitled, X-ray intensity meter, which application is assigned to the same assignee as the present invention.

One of the objects of the present invention is to improve the accuracy of measuring visible and invisible radiations by the system disclosed in said copending application.

Another object of this invention is to provide a means of eliminating the deleterious photo-electric effects in such a radiation measuring system.

Another object of this invention is to prevent deleterious electrical leakage in a gaseous discharge device caused by photo-electric effects.

Other objects and advantages will become apparent as the invention is more fully disclosed.

In copending application by H. C. Rentschler, Serial No. 328,243 referred to above is set forth a system whereby visible light rays, ultraviolet rays or X-radiations are passed into a discharge device which is sensitive to such radiations to cause a small electric current to flow through the device, the amount of the current flow depending upon the intensity of the radiations.

The ray sensitive device is connected to a source of potential and to a condenser of predetermined capacity so that after the ray sensitive device has been subjected to a definite quantity of the radiations being investigated the condenser will acquire a definite potential.

The terminals of the condenser are connected to the terminals of a gaseous conduction device having a definite break down potential such as a gaseous discharge lamp or a glow relay tube. When the condenser has acquired a potential equal to the break down voltage of the gaseous conduction device the condenser discharges through the device and either records the discharge, operates a signal or sets mechanism into operation to terminate the source of the radiations.

As the potential required to initiate the discharge in the gaseous conduction device is definite and may be readily regulated or adjusted, the amount of radiations or the intensity thereof which build up the required potential in the condenser, may readily be calculated or determined, and the number of discharges obtained may be utilized as a means of measuring these radiations.

The usual type of gaseous conduction device employed in this type of ray intensity meter system is disclosed in copending application by H. C. Rentschler Serial No. 252,437 filed February 7, 1928 and Serial No. 350,164 filed March 27, 1929 and application Serial No. 419,524, filed January 9, 1930, all of which are assigned to the same assignee as the present invention. Briefly the glow relay tube disclosed therein is comprised substantially of an enclosing glass envelope, an inert gas filling, a cathode and two anodes, one of which anodes is positioned in closer spaced relationship to the cathode than the other by means of a starting tip member extending from the cathode to within a predetermined distance from the anode.

By thus spacing one anode and the cathode a glow discharge may be initiated therebetween at a lower and at a more predetermined voltage, than with the other anode.

To facilitate the breakdown or initiation of the gas discharge of the device and to lower the required break down voltage under any given set of electrode spacings, gas pressure and the like, the interior surface of the cathode of the device is covered with a coating of an electro-positive metal such as the alkali metals, misch metal and the like. To further facilitate the break down of the device one or both of the anode electrode tips, preferably at least the closer spaced electrode, may be comprised of a highly reactive rare refractory metal such as thorium, titanium, uranium and the like.

I have found, however, that when such a glow discharge device is employed in combination with the ray intensity measuring system of the above identified copending application Serial No. 328,243, that a material loss in the electrical energy accumulating in the condenser of the system, is obtained, due to certain photoelectric leakages within the glow discharge device, resulting in material inaccuracies in the measurement of the radiations being investigated. When such radiations are composed of ultra-violet, X-ray or cathode radiations it is appreciated that it is highly essential that any system for the determination of the amount of these radiations must be extremely accurate. To obtain such accuracy I have found that electrical leakages due to photo-electric effects within the glow discharge device must be substantially eliminated, by the provision of a suitable light impermeable housing about the glow discharge device.

Before further disclosing the nature of my invention reference should be had to the accompanying drawings wherein, Fig. 1 is a diagrammatic showing of a system for controlling the operation of an X-ray tube in accordance with the quantity of such rays produced;

Fig. 2 is a diagrammatic showing of a system for measuring light in the visible or ultra-violet region of the spectrum;

Fig. 3 is a diagrammatic showing of a means for recording the intensity of the radiations, and Fig. 4 is a side elevational view partly in cross-section of a glow discharge device mounted in accordance with the present invention in a substantially light proof housing, so as to eliminate the deleterious photo-electric effect producing the electrical leakage in the system.

The system illustrated in Fig. 1 comprises an X-ray tube 1 of any suitable construction, having an incandescent cathode 2 and an anode 3. The arrangement of the electrodes is such that the X-rays 4 pass out of the tube axially through one end 5 thereof. The cathode 2 is heated by a suitable battery 6 and operating current is supplied to the cathode and anode from a suitable transformer 7 by conductor 8 connected to the anode and conductor 9, switch 10 and conductor 11, connected to one terminal of the cathode. The X-rays 4 are passed through an ionization chamber 12 having a suitable ionizable gaseous filling and a pair of spaced electrodes 13 and 14. The electrode 13 is connected to one side of a condenser 15 of variable or fixed capacity and the electrode 14 is connected to the opposite side of the condenser. A battery 16 is provided in series with the condenser and the ionization chamber.

The amount of ionization of the gas in the ionization chamber 12 is dependent upon the quantity of X-rays passing therethrough, and the current flowing through the ionization chamber is dependent upon the amount of ionization thereof.

Consequently by suitably adjusting the condenser 15 to a definite capacity and assuming no leakage to occur, the condenser may be charged up to a predetermined voltage by the current flowing through the ionization chamber, after a predetermined quantity of X-rays have been passed therethrough.

The terminals of the condenser are connected in the input circuit of an amplification system comprising a glow relay tube 17 of the starting anode type having a cathode 18, a main anode 20 and a starting anode 19. A starting tip 21 extends from the cathode 18 into proximity to the starting anode 19 so as to reduce the effective gap between the cathode and the starting anode. A tube of this type is fully described in copending application, Serial No. 252,437 above identified, and an improvement thereof is disclosed in copending application Serial 419,524, also above identified.

Due to the specific arrangement of the anodes with respect to the cathode, a higher voltage is required to initiate a discharge from the main anode to the cathode than from the starting anode to the cathode and in the operation of such a tube the circuit arrangement is such that normally the voltage applied to the main anode 20 is insufficient to start a discharge through the tube until the resistance of the tube has been decreased by the initiation of a discharge from the starting anode to the cathode.

The amount of current required to start a discharge between the starting anode and the cathode is extremely minute being in the neighborhood of only about .1 of a micro ampere, but may be predetermined in amount by the proper adjustment in the electrode spacing and the use of the proper gas filling and gas pressures within the device.

The terminals of the condenser 15 are connected respectively to the starting anode 19 and the cathode 18 of the relay tube 17 by conductors 22 and 23 so that when the condenser has been charged to the breakdown voltage of the gap between the starting anode and the cathode, it initiates a low current discharge in the starting anode tube which decreases the resistance of the tube sufficiently to enable a larger current discharge to start between the main anode 20 and the cathode.

A suitable source of potential 24 is provided in series with the main anode and the cathode for creating and maintaining this discharge.

With such an arrangement the starting anode gap under the control of the condenser 15 serves as a trigger device for initiating the main discharge from the anode 20. The discharge in the output circuit including the battery 24 and the electrodes 18 and 20 may be of relatively high current flow, that is, of several hundred milliamperes and may be utilized to operate a sensitive relay or switch to control a signal or such current may be still further amplified by a second glow relay tube as shown in the drawings.

The amplifying glow relay tube 25 also is provided with a cathode 26, main anode 28 and starting anode 27 and has the input circuit, including the starting anode 27 and the cathode 26, coupled to the output circuit of the glow relay tube 17 through a transformer 29 so that upon the occurrence of a discharge in the first relay tube, a starting discharge will occur in the second amplifying relay tube. A source of potential 30 is provided for the output circuit of the amplifying tube 25 and the current flowing in the output circuit is utilized to control a switch 10 through a suitable winding 31. The amplifying tube 25 is of a less sensitive, larger output type than the first relay 17 and is capable of supplying very large currents for directly operating electromagnetic relays. This amplification system employing a plurality of glow relay tubes is more fully described in a copending application of Rentschler and Henry, Serial No. 324,557 filed December 7, 1928 and entitled Amplification system for glow relay devices.

With the system described it will be noted that after a predetermined quantity of X-rays have been generated, the condenser 15 will be charged to a definite potential at which it will initiate a momentary discharge in the glow relay tube 17 and such discharge will enable a larger current continuous discharge to be passed therethrough which when amplified by the second relay tube will operate the switch 10 and open the circuit to the X-ray tube, thus terminating its operation.

The charging of the condenser 15 to the predetermined voltage is determined by the quantity of the X-rays and by the period of application. Therefore, from the time required to charge a condenser of definite capacity the quantity of the X-rays can be readily determined.

In accordance with the present invention I enclose the glow relay tubes 17 and 25 in a light impervious housing 52 whereby the electrical charge accumulating in condenser 15 is substantially prevented from being progressively discharged as electrical leakage from the starting anodes 19 and 27 to the closely spaced starting tip 21 as a result of photo electric electron emission from the sputtered misch metal or alkali metal superficially, covering the surface of the cathodes 18 and 26.

In Fig. 2 I have illustrated an arrangement for indicating the intensity of a source of either visible or ultra violet light, in which the ionization chamber is replaced by a photo-electric cell which is sensitive to the particular band of radiations being measured.

The source of radiations, which by way of example may comprise an arc 32, produced between a pair of electrodes, is positioned so as to project the light upon the cathode 34 of a photo electric cell 35 contained within a closed chamber 36 having an aperture 37 therein. The cathode 34 is electrically connected through a battery 38 to one terminal of the variable condenser 39, the other terminal of which is connected to the anode 40 of the photo electric cell.

The condenser 39 is connected in the input circuit of the starting anode tube 41, across the starting anode 42 and cathode 43, as in the embodiment of Fig. 1 and the output circuit of the starting anode tube includes a battery 44 and winding 45 of an electromagnetic switch 46. The contacts 47 and 48 of the switch are connected to an indicating device 49 through a source of potential 50.

When the arc 32 is operating, the light produced, causes a current flow through the photoelectric cell 35, the intensity of which is proportional to the intensity of the light source, and the condenser 39 becomes charged up to the breakdown potential of the starting anode tube 41 in a period of time dependent upon the intensity of the light.

By varying the capacity of the condenser, the time required to charge it to the break down potential of the starting anode tube, may be varied. With this arrangement if it is desired, for instance to regulate the quantity of ultra-violet light utilized for any desired purpose, the condenser may be adjusted to the proper calibrated capacity so that after the required quantity of rays have been produced, the indicating device 49 will be set into operation to signal the operator.

In this radiation measuring device the photo electric activity of the glow relay tube 41 must also be entirely suppressed by the use of a light impervious housing 52 in order to obtain accurate measurement of the radiations from the light source 32.

If it is desired to measure light in the ultraviolet region, the cathode 34 of the photo-electric cell should be composed of a material which is sensitive to this range of frequencies such as cadmium or misch metal, or preferably thorium. For measurements in the red and yellow region the cathode may be coated with a sub-oxide of cæsium.

In some cases it may be desirable to have a continuous record of the quantity of exposure or average intensity of the light prevailing for a definite period. For example, the Weather Bureau or Health Department or a doctor giving treatment may desire to know the total quantity of ultra-violet light available on certain days in sunlight or from an artificial source.

In Fig. 3 an arrangement is shown for making a permanent recording of the light conditions. In this arrangement the condenser 39 is connected to the terminals of a discharge lamp 51 of the gaseous conduction type. I have found, that when the electrodes of such a lamp are composed of thorium, operating in a gas such as neon, argon or helium, that the break down potential is extremely constant.

The discharge lamp 51 is contained within a light proof housing 52 having a separate compartment 53 containing a photographically sensitized strip 54 which may be continuously moved at a uniform rate past an aperture 55, as by clock work. The sensitized strip may be fed from a spool 56 and wound upon a second spool 57.

When the condenser 39 becomes charged to the break down potential of the lamp 51, it discharges through the lamp producing a momentary flash of light which is recorded upon the sensitized strip 54. When the discharge, which is of an extremely short duration, has passed the condenser again charges up as light continues to fall on the photo electric cell until a second discharge occurs. The intensity of the light falling upon the photoelectric cell may be determined by the number of such discharges in a definite interval, the frequency of the discharge derived by the time interval giving the average intensity.

In place of the photographic strip 54, the current flow produced upon breakdown of the lamp 51 or similar gaseous conduction device may be used to operate the arm of a counter mechanism or of a chronograph.

In Fig. 4 is shown in detail the light impervious housing 52 enclosing the glow discharge device, the housing being partly in cross section to show the positioning of the device therein, and the method of bringing in the current conducting lead wires to the electrodes of the device.

It is apparent that there may be many modifications and departures from the specific embodiment of the present invention disclosed herein without essentially departing from the nature thereof, and all such departures and modifications are anticipated as may fall within the scope of the following claims.

What is claimed is:

1. A system for measuring the intensity of electro-magnetic radiations comprising an electrical discharge device, the resistance of which is varied by changes in the intensity of such radiations, a source of potential and a condenser in circuit with said discharge device, a gaseous conduction device electrically connected to the terminals of the condenser and means associated with said gaseous conduction device for preventing deleterious photo-electric leakage within said gaseous conduction device.

2. A system for measuring the intensity of electro-magnetic radiations comprising an electrical discharge device, the electrical resistance of which is varied by changes in the intensity of such radiations, a source of potential electrically connected to said device, a condenser also electrically connected to said device and adapted to be charged by current flow through said device, a gaseous conduction device having a definite breakdown potential and connected to the terminals of said condenser, means associated with said gaseous conduction device shielding said gaseous conduction device from deleterious photo-electric discharges.

3. A system for measuring the intensity of light comprising a photo-electric cell subject to light, a condenser, a source of potential in circuit with said photo-electric cell, means electrically connected to said condenser and operative to discharge said condenser after it has acquired a predetermined charge and means associated with said first mentioned means for preventing electrical leakage of said charge prior to discharge from said condenser at said first mentioned means.

4. A system for measuring the intensity of light comprising a photo-electric cell subject to light, a condenser and a source of potential all in circuit, means electrically connected to and operative to discharge said condenser after said condenser has acquired a predetermined charge, means associated with said last mentioned means for preventing electrical leakage of said charge prior to discharge from said condenser through said first mentioned means and means associated with said first mentioned means for indicating when such discharges occur.

5. The combination with a tube for producing electro-magnetic radiations of an electrical discharge device subject to radiations therefrom the resistance of said device being variable with changes in intensity of said radiations, a source of potential and a condenser in circuit with said device, a relay tube having a definite breakdown voltage, an input circuit including said relay tube and said condenser, an output circuit including said relay tube, means associated with said relay tube for preventing electrical leakage from said condenser through said relay tube, and means operatively positioned relative to said output circuit and responsive to current flow in said output circuit for setting electrical apparatus into operation.

6. The combination with an X-ray tube of an ionization chamber subject to X-radiations therefrom, a source of potential and a condenser in circuit with said ionization chamber, a relay tube having a definite breakdown voltage, an input circuit including said relay tube and said condenser, an output circuit including said relay tube, means associated with said relay tube for preventing electrical leakage from said condenser through said relay tube, and means operatively positioned relative to said output circuit and responsive to current flow in said output circuit for controlling the operation of said X-ray tube.

7. The combination with an X-ray tube of a circuit for supplying current thereto, an ionization chamber subject to X-radiations from said tube, a source of potential in series with said ionization chamber, a relay tube having a definite breakdown potential, an input circuit including said relay tube, means in said input circuit operative upon a predetermined flow of electricity through said ionization chamber to produce a discharge in said relay tube, said means being in series with said ionization chamber and said source of potential an output circuit including the relay tube, means associated with said relay tube for preventing electrical leakage from said first mentioned means through said relay tube, a switch in the X-ray tube circuit and means operatively positioned relative to said output circuit and responsive to current flow in said output circuit for operating said switch.

8. The combination with an X-ray tube of an ionization chamber subject to X-radiations therefrom, a source of potential and a variable condenser in circuit with said ionization chamber, an input circuit including a glow relay tube of the starting anode type and said condenser, an output circuit including said relay tube, means associated with said relay tube for preventing electrical leakage from said condenser through said relay tube and means operatively positioned relative to said output circuit and responsive to current flow in said output circuit for setting electrical apparatus into operation.

9. The combination with an X-ray tube of an ionization chamber subject to X-radiations therefrom, a source of potential and a condenser in circuit with said ionization chamber, an input circuit including a glow relay tube of the starting anode type and said condenser, an output circuit including said glow relay tube, means associated with said glow relay tube for preventing electrical leakage from said condenser through said relay tube, a source of current for said output circuit and means operatively positioned relative to said output circuit and responsive to current flow in the output circuit for terminating the operation of the X-ray tube.

10. Apparatus for measuring the intensity of electro-magnetic radiations comprising an electrical discharge device subject to such radiations, a source of potential and condenser in circuit with said device, a glow relay tube of the starting anode type, an input and an output circuit including said glow relay tube, means associated with said relay tube for preventing electrical leakage from said condenser through said relay tube, amplifying means coupled to said output circuit and means operatively positioned relative to said amplifying means and responsive to current flow in said amplifying means for setting electrical apparatus into operation.

11. The combination with an X-ray tube of an ionization chamber subject to X-radiations therefrom, a source of potential and a variable condenser in circuit with said ionization chamber, an input circuit including a glow relay tube of the starting anode type and said condenser, an output circuit including said relay tube, means associated with said relay tube for preventing electrical leakage from said condenser through said relay tube, a source of direct current in said output circuit and means operatively positioned relative to said output circuit and responsive to current flow in said output circuit for terminating the operation of said X-ray tube.

12. The combination with an X-ray tube of an ionization chamber subject to X-radiations therefrom, a source of potential and a condenser in circuit with said ionization chamber, an input circuit including a glow relay tube of the starting anode type and said condenser, an output circuit including said glow relay tube, means associated with said relay tube for preventing electrical leakage from said condenser through said relay tube, a source of current in said output circuit and means operatively positioned relative to said output circuit and responsive to current flow in said output circuit for controlling the operation of said X-ray tube.

CHARLES HASTINGS THOMAS.